(12) United States Patent
Leonard

(10) Patent No.: US 8,990,002 B1
(45) Date of Patent: Mar. 24, 2015

(54) METHOD AND APPARATUS FOR DETERMINING THE RELATIVE POSITION OF A TARGET

(75) Inventor: James V. Leonard, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 610 days.

(21) Appl. No.: 13/273,818

(22) Filed: Oct. 14, 2011

(51) Int. Cl.
| | |
|---|---|
| *G01S 15/02* | (2006.01) |
| *G01S 15/50* | (2006.01) |
| *B63B 22/00* | (2006.01) |
| *B63B 45/08* | (2006.01) |
| *G01S 5/02* | (2010.01) |

(52) U.S. Cl.
CPC ............. *G01S 5/0284* (2013.01); *G01S 5/0294* (2013.01)
USPC .................... 701/302; 701/300; 367/1; 367/3

(58) Field of Classification Search
None
See application file for complete search history.

(56) References Cited

U.S. PATENT DOCUMENTS

| | | | | |
|---|---|---|---|---|
| 4,639,900 | A | * | 1/1987 | Gustafson ........................ 367/5 |
| 5,228,854 | A | * | 7/1993 | Eldridge ......................... 434/11 |
| 5,838,636 | A | * | 11/1998 | Ashford et al. ................. 367/95 |
| 6,349,898 | B1 | | 2/2002 | Leonard et al. |
| 6,615,116 | B2 | | 9/2003 | Ebert et al. |
| 6,755,372 | B2 | | 6/2004 | Menzel et al. |
| 6,763,289 | B2 | | 7/2004 | Leonard et al. |
| 7,002,336 | B2 | | 2/2006 | Leonard et al. |
| 7,228,261 | B2 | | 6/2007 | Leonard et al. |
| 7,255,608 | B2 | | 8/2007 | Lalumandier et al. |
| 7,353,090 | B2 | | 4/2008 | Leonard et al. |
| 7,869,385 | B2 | | 1/2011 | Leonard et al. |
| 7,968,831 | B2 | | 6/2011 | Meyer et al. |
| 8,552,836 | B2 | | 10/2013 | Pollema et al. |
| 8,714,979 | B2 | | 5/2014 | Leonard et al. |
| 2008/0165617 | A1 | * | 7/2008 | Abbot et al. ....................... 367/3 |
| 2009/0037214 | A1 | | 2/2009 | Leonard et al. |
| 2010/0116886 | A1 | * | 5/2010 | Flowers ........................ 235/404 |

OTHER PUBLICATIONS

U.S. Appl. No. 12/968,815, filed Dec. 15, 2010; In re: Leonard et al., entitled *Method and Apparatus for Providing a dynamic Target Impact Point Sweetner.*

* cited by examiner

*Primary Examiner* — John R Olszewski
*Assistant Examiner* — Gerrad A Foster
(74) *Attorney, Agent, or Firm* — Alston & Bird LLP

(57) ABSTRACT

A method, apparatus and system are provided to permit an aerial asset to determine its current location and to, in turn, locate and track a target even as efforts are made by others to jam or otherwise hinder offboard communications that may prevent reliance upon GPS or other positioning systems. A method includes receiving, at a navigation control vehicle, information regarding the relative position of a target with respect to each of the at least two sonobuoys. The method also determines a relative position of the target with respect to the navigation control vehicle at least partially based on the information regarding the relative position of the target with respect to each of the at least two sonobuoys. The method provides information regarding the relative position of the target to an aerial asset to facilitate location of the target by the aerial asset.

20 Claims, 4 Drawing Sheets

METHOD AND APPARATUS FOR DETERMINING THE RELATIVE POSITION OF A TARGET

TECHNOLOGICAL FIELD

Embodiments of the present disclosure relate generally to the determination of the position of a target and, more particularly, to the determination of the relative position of the target with respect to one or more aerial vehicles.

BACKGROUND

Various types of aerial assets, including unmanned aerial vehicles (UAVs), missiles and the like, are employed to locate, track and intercept targets. For example, missiles of one form or another had been used in combat for centuries prior to the development of guided missile technology in the World War II era. Since then numerous technologies were developed in order to guide aerial assets to their targets or to otherwise locate a target. The use of some form of radiation (e.g., laser or radio waves) has been a common element in many of these guidance systems. However, as advancements in aerial guidance have improved, target sophistication continues to improve as well. The cost and complexity of each aerial asset, although being typically only a fraction of the cost and complexity of most targets, makes it ever more imperative that each aerial asset that is deployed should be as effective as possible. Accordingly, it becomes increasingly desirable to continue to develop enhancements in target location and guidance systems to further the likelihood of success when such aerial assets are employed.

Aerial assets, such as missiles, with increasingly more sophisticated target location and guidance systems have been developed over the years. However, many of these target location and guidance systems require the aerial asset to be able to determine its current location in order to permit the location of the target to be determined. Aerial assets include a variety of systems for determining their current location, but most of these systems require offboard communication. For example, an aerial asset may include a global positioning system (GPS) that requires communication with a plurality of GPS satellites. In some instances, offboard communication by the aerial asset may be prevented, such as in instances in which communication by the aerial asset is jammed. In these instances, the aerial asset may be unable to determine its current location and, as a result, may be unable to determine the location of the target since the location of the target is generally determined relative to the location of the aerial asset.

Inertial navigation systems have been utilized in order to determine the location of an aerial asset without any requirement for offboard communication. While an inertial navigation system may not be susceptible to being jammed, the location determined by an inertial navigation system may drift over time. As such, the location of an aerial asset as determined by an inertial navigation system may not be as accurate as desired, particularly in instances in which the inertial navigation system is utilized for a period of time such that the error attributable to drift accumulates. Since an inertial navigation system may not determine the location of an aerial asset with sufficient precision, reliance upon an inertial navigation system, at least for extended periods of time, may also unable to locate and track a target in as precise a manner as is desired.

BRIEF SUMMARY

Some embodiments of the present disclosure provide for the location of a target in a manner that is both accurate and less susceptible to being jammed. As such, a method, apparatus and system of some embodiments of the present disclosure may permit an aerial asset to determine its current location and to, in turn, locate and track a target even as efforts are made by others to jam or otherwise hinder offboard communications that may prevent reliance upon GPS or other positioning systems. Additionally, the method, apparatus and system of some embodiments of the present disclosure may permit an aerial asset to determine its current location in a reliable manner that is not subject to drift or at least less subject to drift than an inertial navigation system.

In one example embodiment, a method is provided that includes receiving, at a navigation control vehicle, information regarding the relative position of a target with respect to each of at least two sonobuoys. The method also determines a relative position of the target with respect to the navigation control vehicle at least partially based on the information regarding the relative position of the target with respect to each of the at least two sonobuoys. Further, the method provides information regarding the relative position of the target with respect to the navigation control vehicle to an aerial asset, such as a UAV or a missile, to facilitate location of the target by the aerial asset. In this regard, the information regarding the relative position of the target with respect to the navigation control vehicle to the aerial asset may be provided without provision of an absolute position of the target.

The method of one embodiment may determine a relative position of each of the at least two sonobuoys with respect to the navigation control vehicle. In this embodiment, the determination of the relative position of the target with respect to the navigation control vehicle may include determining the relative position of the target with respect to the navigation control vehicle at least partially based upon the relative position of each of the at least two sonobuoys with respect to the navigation control vehicle. The method of one embodiment may also place a swarm of sonobuoys in a spaced apart relationship relative to one another and relative to the target. In one embodiment in which the information regarding the relative position of the target with respect to each of the at least two sonobuoys is based upon a direction of the target relative the respective sonobuoy, the method may also determine the relative position of the target with respect to the at least two sonobuoys based upon triangulation.

In another embodiment, an apparatus is provided that includes a receiver configured to receive information regarding the relative position of a target with respect to each of the at least two sonobuoys. The apparatus may also include a processor configured to determine a relative position of the target with respect to the navigation control vehicle at least partially based on the information regarding the relative position of the target with respect to each of the at least two sonobuoys. The apparatus may further include a transmitter configured to provide information regarding the relative position of the target with respect to the navigation control vehicle to an aerial asset, such as a UAV or a missile, to facilitate location of the target by the aerial asset. In this regard, the transmitter may be configured to provide the information regarding the relative position of the target with respect to the navigation control vehicle to the aerial asset without provision of an absolute position of the target.

The processor of one embodiment may be further configured to determine a relative position of each of the at least two sonobuoys with respect to the navigation control vehicle. In this embodiment, the processor may be configured to determine the relative position of the target with respect to the navigation control vehicle by determining the relative position of the target with respect to the navigation control vehicle at least partially based upon the relative position of each of the at least two sonobuoys with respect to the navigation control vehicle. In one embodiment in which the information regarding the relative position of the target with respect to each of the at least two sonobuoys is based upon a direction of the target relative the respective sonobuoy, the processor may be further configured to determine the relative position of the target with respect to the at least two sonobuoys based upon triangulation.

In a further embodiment, a system is provided that includes at least two sonobuoys configured to detect a target and to determine a relative position of the target with respect to each of the at least two sonobuoys. For example, the system of one embodiment may include a swarm of sonobuoys in a spaced apart relationship relative to one another and relative to the target. The system may also include a navigation control vehicle configured to receive information regarding the relative position of a target with respect to each of the at least two sonobuoys, to determine a relative position of the target with respect to the navigation control vehicle at least partially based on the information regarding the relative position of the target with respect to each of the at least two sonobuoys, and to provide information regarding the relative position of the target with respect to the navigation control vehicle. The system may also include an aerial asset, such as a UAV or a missile, configured to receive the information regarding the relative position of the target with respect to the navigation control vehicle and to determine a relative position of the target with respect to the aerial asset at least partially based on the information regarding the relative position of the target with respect to the navigation control vehicle.

The navigation control vehicle may be further configured to provide the information regarding the relative position of the target with respect to the navigation control vehicle without provision of an absolute position of the target. In this embodiment, the aerial asset may be further configured to determine the relative position of the target with respect to the aerial asset without receipt of the absolute position of the target.

The navigation control vehicle of one embodiment may be further configured to determine a relative position of each of the at least two sonobuoys with respect to the navigation control vehicle and to determine the relative position of the target with respect to the navigation control vehicle by determining the relative position of the target with respect to the navigation control vehicle at least partially based upon the relative position of each of the at least two sonobuoys with respect to the navigation control vehicle. The aerial asset of one embodiment may be further configured to determine a relative position of the navigation control vehicle with respect to the aerial asset and to determine the relative position of the target with respect to the aerial asset by determining the relative position of the target with respect to the aerial asset at least partially based upon the relative position of the navigation control vehicle with respect to the aerial asset.

The aerial vehicle may include a master aerial vehicle that is further configured to generate a composite multi-dimensional representation of the target based on radar data received from other aerial vehicles that have collected projections over an area in which the target is located and further based on radar data collected by the master aerial vehicle. The master aerial vehicle of this embodiment is also configured to identify the target based on the composite multi-dimensional representation and to generate aimpoint data regarding the target based on an identity of the target. The master aerial vehicle is further configured to identify the target based on the composite multi-dimensional representation. The master aerial vehicle may be further configured to generate aimpoint data regarding the target based on an identity of the target. The aimpoint data may define a most vulnerable point on the target.

The features, functions and advantages that have been discussed can be achieved independently in various embodiments of the present disclosure or may be combined in yet other embodiments, further details of which can be seen with reference to the following description and drawings.

BRIEF DESCRIPTION OF THE SEVERAL VIEWS OF THE DRAWINGS

Figure 1:
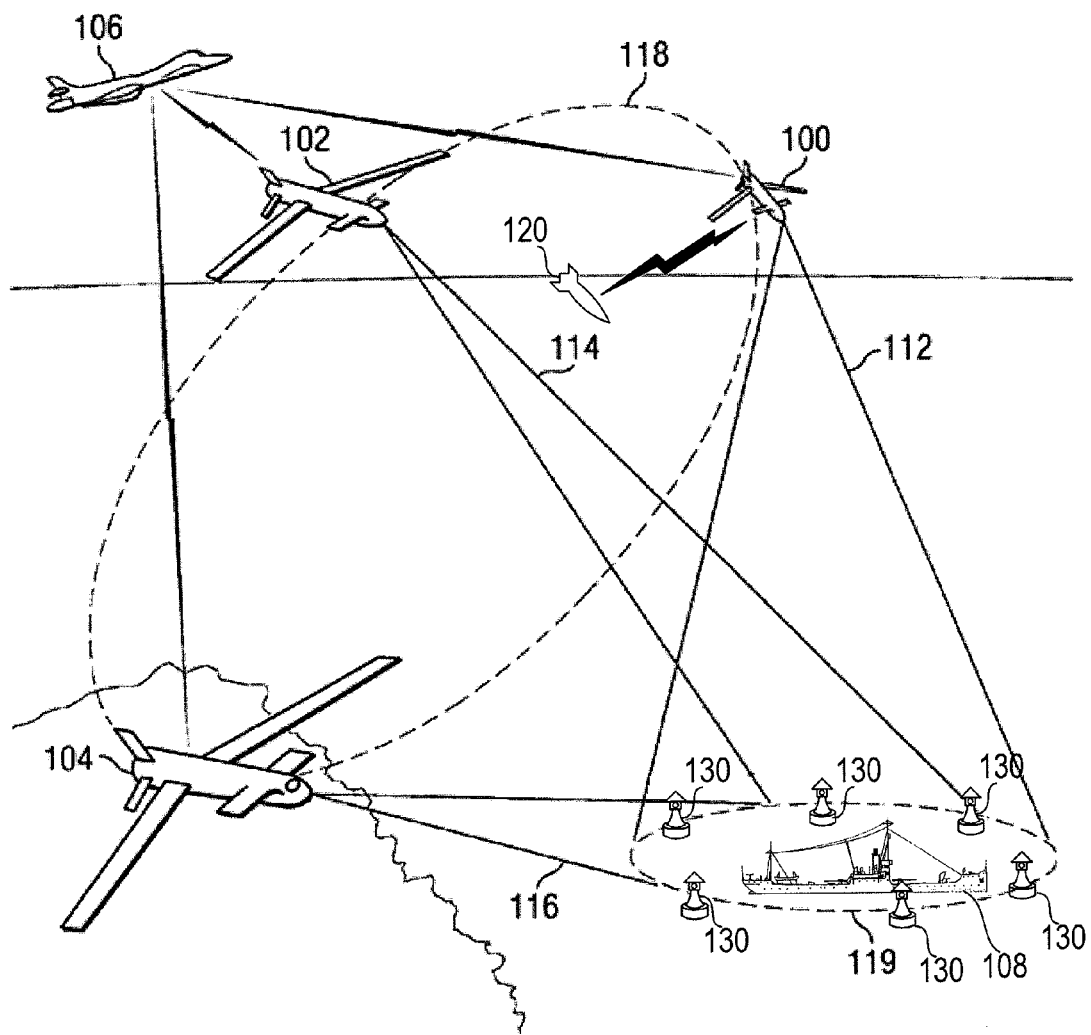
Figure 2:
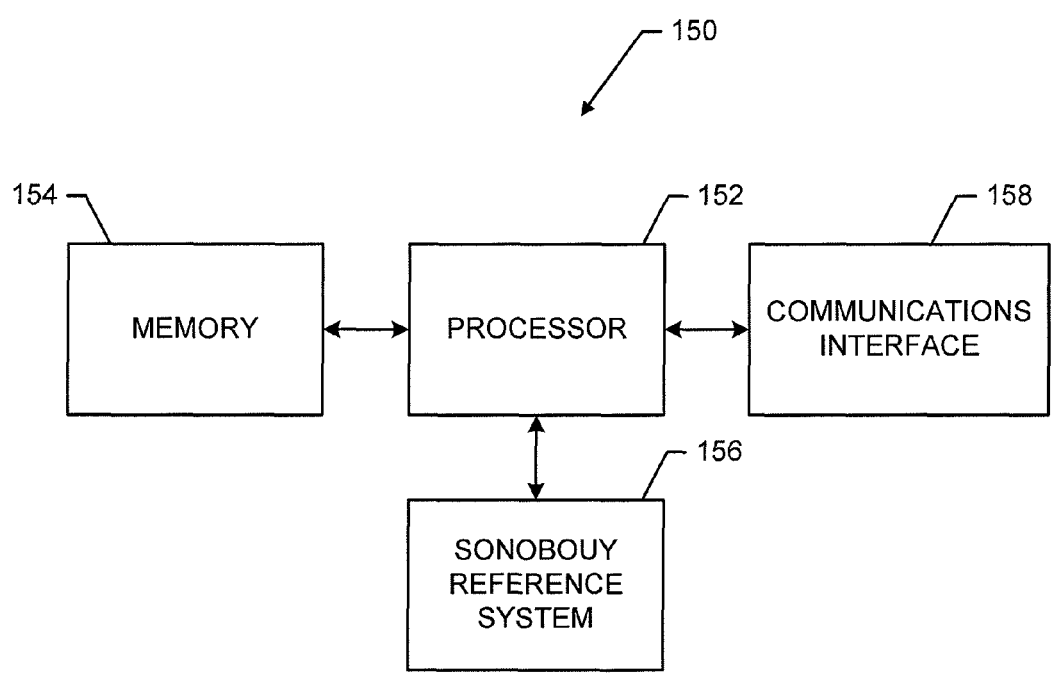
Figure 3:
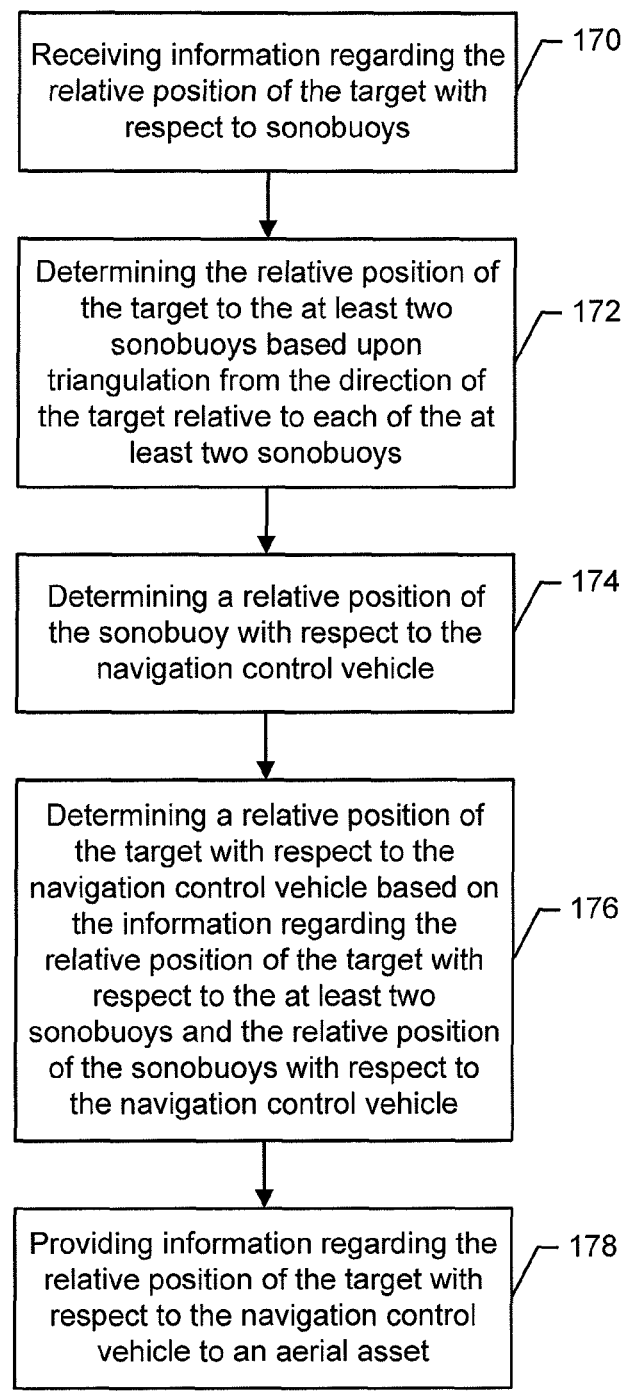
Figure 4:
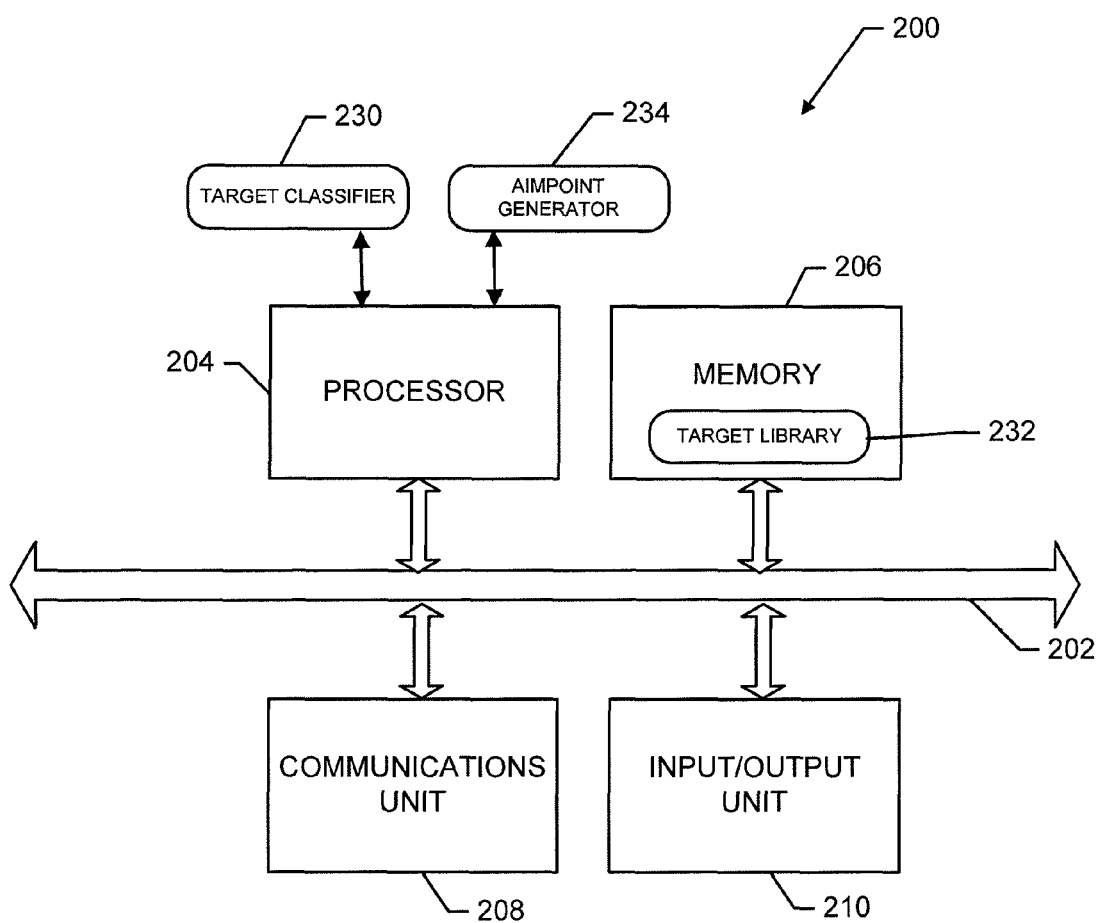

Having thus described the disclosure in general terms, reference will now be made to the accompanying drawings, which are not necessarily drawn to scale, and wherein:

FIG. 1 illustrates a system for determining the relative position of a target according to an example embodiment;

FIG. 2 illustrates a block diagram of hardware that may be employed on a navigation control vehicle according to an example embodiment;

FIG. 3 illustrates a process flow for operation of a navigation control vehicle according to an example embodiment; and FIG. 4 illustrates a block diagram of hardware that may be employed on a master vehicle or any aerial asset that can function as the master vehicle according to an example embodiment.

DETAILED DESCRIPTION

The present disclosure now will be described more fully hereinafter with reference to the accompanying drawings, in which some, but not all embodiments are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout.

The method and apparatus of example embodiments may be utilized in a variety of systems in order to determine the relative position of a target, even in instances in the absolute position of the target cannot be determined, such as in instances in which the GPS or other positioning system is jammed. By way of example, FIG. 1 illustrates a system for determining the relative location of a target. The system of FIG. 1 illustrates a plurality of aerial assets (e.g., unmanned aerial vehicles (UAVs) 100, 102 and 104 and missile 120) and a navigation control vehicle 106 that may be in communication with the aerial assets. As shown in FIG. 1 and as described below, the navigation control vehicle 106 may be a manned aircraft, but the navigation control vehicle of other embodiments may be a ship or other ground-based platform. Additionally, the navigation control vehicle 106 may have been the platform from which the aerial assets were launched. In other embodiments, however, at least some of the aerial assets may be launched from another platform independent of the navigation control vehicle 106.

In an example embodiment, the aerial assets may be any combination of different types of missiles 120, unmanned aerial vehicles (UAVs) 100, 102, 104 or aircraft that may be capable of interacting with the target 108, such as by obtaining radar data pertaining to the target, intercepting the target or the like. It should also be appreciated that although four aerial assets are shown in FIG. 1, any number of aerial assets could be employed in some embodiments (e.g., including fewer or more aerial assets).

In addition to the navigation control vehicle 106 and the aerial assets, the system of an example embodiment may also include two or more sonobuoys 130. Indeed, the system of one embodiment may include a swarm of sonobuoys, that is, three or more sonobuoys. The sonobuoys 130 are generally disposed in the vicinity of the target 108. The sonobuoys 130 may be disposed in various configurations, such as a generally linear configuration, e.g., a picket fence-type configuration, or as a closed shape, such as a circle. In either instance, the sonobuoys 130 may be positioned proximate the target 108 and, in an embodiment in which the sonobuoys are positioned in a closed shape, such as a circle, the sonobuoys may be positioned around the target, such as shown in FIG. 1. As also shown in FIG. 1, the sonobuoys 130 may be spaced apart, not only from the target 108, but also from one another. The sonobuoys 130 may be deployed in various manners. In one embodiment, however, the sonobuoys 130 are deployed from an aircraft, such as the navigation control vehicle 106.

Once deployed, the sonobuoys 130 are configured to receive incoming signals and to detect the presence of the target 108. For example, the sonobuoys 130 may include a communications unit including a receiver configured to receive signature signals from the target, such as signals indicative of engine noise, rudder noise, protrusion noise or the like. In response to the receipt of the signals from the target 108, the sonobuoys 130 may be configured to determine the relative location of the target with respect to the sonobuoys. In this regard, each sonobuoy 130 may include a processor that is configured to determine the direction or angle of the target 108 with respect to the sonobuoy. The relative location of the target 108 with respect to the sonobuoy 130 may therefore be defined in terms of the direction or angle to the target.

Each sonobuoy 130 may also be configured to provide and the navigation control vehicle 106 may be configured to receive information regarding the relative position of the target 108 with respect to the respective sonobuoy. For example, the communications unit of the sonobuoy 130 may include a transmitter configured to transmit the information regarding the relative position of the target 108 to the navigation control vehicle 106. The navigation control vehicle 106 may, in turn, be an aerial vehicle, such as a P-3C or P-8 aircraft, that is configured to communicate with two or more sonobuoys 130.

In one embodiment, for example, the navigation control vehicle 106 may include hardware 150, such as shown in FIG. 2, configured to receive the information regarding the relative position of the target 108 with respect to the respective sonobuoy 130 and to perform other related functions. In this regard, the navigation control vehicle 106 may include or otherwise be in communication with a processor 152, a memory device 154, a sonobuoy reference system (SRS) 156 and a communications interface 158. The memory device 154 may include, for example, one or more volatile and/or non-volatile memories. In other words, for example, the memory device 154 may be an electronic storage device (e.g., a computer readable storage medium) comprising gates configured to store data (e.g., bits) that may be retrievable by a machine (e.g., a computing device like the processor 152). The memory device 154 may be configured to store information, data, content, applications, instructions, or the like for enabling the hardware 150 to carry out various functions in accordance with an example embodiment. For example, the memory device 154 could be configured to store instructions for execution by the processor 152.

The processor 152 may be embodied in a number of different ways. For example, the processor 152 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like.

In an example embodiment, the processor 152 may be configured to execute instructions stored in the memory device 154 or otherwise accessible to the processor. Alternatively or additionally, the processor 152 may be configured to execute hard coded functionality. As such, whether configured by hardware or software methods, or by a combination thereof, the processor 152 may represent an entity (e.g., physically embodied in circuitry) capable of performing operations according to an embodiment of the present invention while configured accordingly. Thus, for example, when the processor 152 is embodied as an ASIC, FPGA or the like, the processor may be specifically configured hardware for conducting the operations described herein. Alternatively, as another example, when the processor 152 is embodied as an executor of software instructions, the instructions may specifically configure the processor to perform the algorithms and/or operations described herein when the instructions are executed. The processor 152 may include, among other things, a clock, an arithmetic logic unit (ALU) and logic gates configured to support operation of the processor.

The SRS 156 is an automatic electronic system for locating sonobuoys and may employ angle-measuring equipment, distance-measuring equipment, or both. Meanwhile, the communication interface 158 may be any means such as a device or circuitry embodied in either hardware or a combination of hardware and software that is configured to receive and/or transmit data from/to the sonobuoys 130, the aerial assets or otherwise. In this regard, the communication interface 158 may include, for example, an antenna (or multiple antennas) and supporting hardware and/or software for enabling wireless communications, such as a receiver, a transmitter, a transceiver, etc. Additionally or alternatively, the communication interface 158 may include the circuitry for interacting with the antenna(s) to cause transmission of signals via the antenna(s) or to handle receipt of signals received via the antenna(s).

As described above, the sonobuoys 130 are configured to listen for signals emitted by the target 108. Upon detection of signals emitted by the target 108, the sonobuoys 130 and, in particular, a processor onboard a respective sonobuoy is configured to determine the relative position of the target with respect to the sonobuoy, e.g., the direction or angle to the target from the respective sonobuoy. Each sonobuoy 130, such as a communications unit, e.g., a transmitter, may then transmit information regarding the relative position of the target 108 with respect to the sonobuoy.

From the perspective of the navigation control vehicle 106, the navigation control vehicle and, in particular, the communications interface 158, e.g., a receiver, onboard the navigation control vehicle may be configured to receive information from at least two sonobuoys 130 regarding the relative location of the target 108 with respect to the sonobuoys. See operation 170 of FIG. 3. The information provided by a respective sonobuoy 130 may relate to the relative location of the target 108 in various manners including, for example, the angular direction of the target with respect to the respective sonobuoy. Although the communications interface 158, e.g., receiver, of the navigation control vehicle 106 may receive the information regarding the relative position of the target 108 from two sonobuoys 130, the communications interface of the navigation control vehicle may receive information regarding the relative position of the target from a swarm of sonobuoys, each of which have listened for the target, have received signals from the target and have determined the relative position of the target with respect to the respective sonobuoy.

As shown in operation 172 of FIG. 3, the navigation control vehicle 106, such as the processor 152 of the navigation control vehicle, may be configured to determine the relative position of the target to the at least two sonobuoys 130 that provided the information to the navigation control vehicle. Although the processor 152 of the navigation control vehicle 106 may determine the relative position of the target 108 to the sonobuoys 130 in various mariners, the processor of one embodiment is configured to determine the relative position of the target to the sonobuoys based upon triangulation from the direction of the target relative to each of the at least two sonobuoys.

The navigation control vehicle 106, such as the processor 152 of the navigation control vehicle, may also be configured to determine the relative position of the sonobuoys 130, that is, the sonobuoys that provided the information regarding the relative position of the target, with respect to the navigation control vehicle. See operation 174 of FIG. 3. While the navigation control vehicle 106 may determine the relative position of a respective sonobuoy 130 in various manners, the navigation control vehicle of one embodiment may include a SRS 156 as shown in FIG. 2 that is configured to determine the relative position of a respective sonobuoy that is in communication with the navigation control vehicle.

In one embodiment, the navigation control vehicle 106, such as the processor 152 of the navigation control vehicle, may include or otherwise be able to access information regarding the currents that may affect the position of the sonobuoys 130 and, as a result, may take into account drift of the sonobuoys between the time at which the information regarding the relative location of the target 108 with respect to the sonobuoys was determined and the time at which the navigation control vehicle, such as the SRS 156, determines the relative position of the sonobuoys to the navigation control vehicle since the current may have caused the sonobuoys to move relative to the target during that time period. In this regard, the information regarding the currents in the vicinity of the sonobuoys 130 may be stored by the memory device 154 onboard the navigation control vehicle 106 or otherwise be accessible by the processor 152 of the navigation control vehicle.

Based upon the information provided by a respective sonobuoy 130, such as the relative position of the target 108 with respect to the respective sonobuoy, and the relative position of the respective sonobuoy to the navigation control vehicle 106, the navigation control vehicle, such as the processor 152 of the navigation control vehicle, may be configured to determine the relative position of the target with respect to the navigation control vehicle. See operation 176 of FIG. 3. Although the relative position of the target 108 with respect to the navigation control vehicle 106 may be defined in various manners, the relative position of the target with respect to the navigation control vehicle may be defined in terms of a distance to the target as well as an angular position of the target relative to a reference point. While the navigation control vehicle 106, such as the processor 152 of the navigation control vehicle, may determine the relative position of the target 108 with respect to the navigation control vehicle based upon the information provided by two sonobuoys 130, the navigation control vehicle of one embodiment may receive information regarding the relative position of the target from a swarm of sonobuoys and the processor 152 of the navigation control vehicle may, in turn, determine the relative position of the target with respect to the navigation control vehicle based upon the information provided by the swarm of sonobuoys.

As described above, the information provided by the at least two sonobuoys 130 as to the relative location of the target 108 with respect to the respective sonobuoy identifies the relative, but not the absolute location of the target. Similarly, the navigation control vehicle 106, such as the processor 152 of the navigation control vehicle 106, may determine the relative location of the target 108 with respect to the navigation control vehicle, but not the absolute location of the target. In this regard, the relative location is the location of the target 108 relative to another object, such as a sonobuoy 130, the navigation control vehicle 106 or the like, and not the absolute location of the target independent of the location of any other object. Indeed, in the absence of information regarding the absolute location of the navigation control vehicle 106 or the other aerial assets, such as in an instance in which the GPS or other positioning systems are jammed, the position of the target 108 may best be defined in a relative sense.

As shown in operation 178 of FIG. 3, the navigation control vehicle 106 and, in one embodiment, the communications interface 158, e.g., a transmitter, of the navigation control vehicle may be also configured to provide information regarding the relative location of the target 108 with respect to the navigation control vehicle to one or more aerial assets, such as one or more unmanned aerial vehicle (UAVs) 100, 102, 104, one or more missiles 120 or the like. To facilitate communications between the navigation control vehicle 106 and the aerial assets, the navigation control vehicle and the aerial assets may be networked in such a manner as to utilize, for example, frequency hopping data links so as to prevent or reduce the likelihood of being jammed. The aerial asset to which the information regarding the relative location of the target 108 is directed may include a communications unit, e.g., a receiver, configured to receive the information regarding the relative location of the target with respect to the navigation control vehicle 106 that is provided by the navigation control vehicle. Additionally, the aerial asset may include a processor configured to determine the relative location of the aerial asset from the navigation control vehicle 106, such as in terms of the distance between the aerial asset and the navigation control vehicle and the angular position of the navigation control vehicle with respect to the aerial asset, based upon, for example, the networking between the navigation control vehicle and the aerial asset.

The processor of the aerial asset may also be configured to determine, in turn, the relative location of the target 108 with respect to the aerial asset based upon the relative location of the target 108 with respect to the navigation control vehicle 106 and the relative location of the navigation control vehicle 106 with respect to the aerial asset. As such, the aerial asset, such as the processor of the aerial asset, may identify the relative location of the target 108 with respect to the aerial asset even though the absolute location of the target 108 and, indeed, the absolute location of the aerial asset may not be known, such as a result of the jamming of GPS and other positioning systems of the aerial asset.

Once the relative location of the target 108 with respect to the aerial asset is identified, the aerial asset may interact with the target in the desired manner, such as by tracking the target, capturing images of the target, intercepting the target or the like. In instances in which the target 108 is to be intercepted, such as with a missile 120 or the like, the aerial asset may increase the likelihood of success by capturing an image of the target and determining the aimpoint at which the target should ideally be intercepted. In one example embodiment in which the aerial assets include UAVs 100, 102 and 104 that are configured to capture an image of the target 108, the aerial assets may each include hardware (e.g., antennas and corresponding processing equipment) for projecting beams or cones of electromagnetic radiation from corresponding radar systems onto the target and then collecting the data that returns from those beams or cones. In this example, UAV 100 projects cone 112, UAV 102 projects cone 114, and UAV 104 projects cone 116.

In response to these cones being projected, the different aerial assets may each collect the signals that return from a corresponding one of the cones 112, 114 and 116 to generate respective different partial views of the target 108. Each of the aerial assets 100, 102 and 104 may collect its own data that is reflective of the views it has generated over time while receiving radar data corresponding to the target 108. The radar data may be generated responsive to active transmissions by one or more of the aerial assets 100, 102 and 104 (or even the navigation control vehicle 106). Each of these respective partial images that are generated by the aerial assets 100, 102 and 104 may then be fed to a single master vehicle. In this regard, any one of the aerial assets may serve as the master vehicle in order to perform the master vehicle functions described below. For purposes of illustration but not of limitation, aerial asset 100 may be initially designated as the master vehicle, although this designation may change over time. The master vehicle 100 may more easily communicate with the other aerial assets since it is typically closer in proximity to the other aerial assets than the navigation control vehicle 106 or other control node. In an example embodiment, the aerial assets 100, 102 and 104 may communicate with each other using communication links 118. The master vehicle 100 may then generate a composite 3D image of the object based on the radar data received from each of the other aerial assets (which may be considered to be slave vehicles). Further details regarding the generation of a composite 3D image and the aimpoint data are provided by U.S. patent application Ser. No. 12/968,815, filed Dec. 15, 2010, entitled Method and Apparatus for Providing a Dynamic Target Impact Point Sweetener, the contents of which are incorporated herein by reference. Example embodiments of the present disclosure enable the use of radar images to examine (e.g., with the corresponding cones 112, 114 and 116) an area in which the target 108 may be located, that is, an area of uncertainty (AOU) 119 around the target 108, in order to enable generation of a relatively complete image of the AOU 119 and the target 108 therein. The aerial assets 100, 102 and 104 may fly around the target 108, which may itself also be moving. Thus, the AOU 119 may be moving. Moreover, in some cases, as indicated above, coordination of the flight paths of the aerial assets 100, 102 and 104 may be accomplished via the communication links 118 to provide for control over the formation and/or movement of the aerial assets to improve the quality and/or completeness of the images received therefrom. As such, a relatively accurate composite 3D image of the target 108 may be generated over time to enable identification of the target.

The master vehicle (e.g., aerial asset 100) may receive radar data from each of the other vehicles and combine the received radar data with the radar data collected locally at the master vehicle 100 in order to generate a composite 3D image of the target 108. The composite 3D image may, in some cases, also include data indicative of some internal features of the target 108 in instances where the electromagnetic radiation generated by the radar systems of the aerial assets 100, 102 and 104 has sufficient power to permit the transmitted electromagnetic waves to penetrate (at least to some degree) the target and to reflected by or otherwise returned following interaction with the internal features of the target. The composite 3D image (with or without data indicative of internal features) may then be compared to a target library to determine an accurate model and/or identity of the target 108 as described in greater detail below. Once the target 108 has been identified (or its identity confirmed), aimpoint data may be generated and shared with the other vehicles based on the class or identity of the target. The aimpoint data may then be used by the vehicles to guide prosecution of an attack on the target 108 based on vulnerabilities of the target as determined by the identity or classification of the target. This aimpoint data may, in one embodiment, define the most vulnerable point on the target. In this regard, missile 120 may utilize this aimpoint data in the prosecution of the target 108.

Accordingly, example embodiments may provide for observation of a target 108 to be performed by a plurality of aerial assets in which at least one of the aerial assets is capable of guiding the observation and also performing tomographic reconstruction of a composite 3D image of the target using data received from the aerial assets. The corresponding one of the aerial assets may also be configured to identify the target 108 based on the composite 3D image and share information determined based on the identity (e.g., the composite 3D image itself and/or aimpoint data for the identified target) with the other aerial assets.

FIG. 4 illustrates a block diagram of hardware that may be employed on the master vehicle 100. It should be appreciated that, as indicated above, in some embodiments, all or at least a plurality of the aerial assets have the capability of functioning as the master vehicle 100. Thus, each aerial asset may, in some embodiments, include the structure described in FIG. 4.

As shown in FIG. 4, the aerial assets, such as UAVs 100, 102 and 104, may include a data processing system 200 to process data received responsive to locally received radar returns or return data received by other aerial assets and generate the composite 3D image of the target 108. The data processing system 200 may include a communication bus 202 or other communication fabric to provide communication between the various components of the data processing system 200. The data processing system 200 components may include a processor 204, a memory 206, a communication unit 208 and an input/output unit 210. In an example embodiment, the processor 204 may be configured to execute instructions stored in a memory device (e.g., memory 206) or otherwise accessible to the processor 204. By executing stored instructions or operating in accordance with hard coded instructions, the processor 204 may control the operation of the data processing system 200 by directing functionality of the data processing system 200 associated with implementing composite 3D image generation and target identification described herein. In an example embodiment, the input/output unit 210 may provide for connection to any other modules that may be used in connection with the data processing system 200. Thus, for example, the input/output unit 210 may provide for an interface with a radar system for generating transmissions and receiving and/or processing return data. The input/output unit 210 may also provide for any other interface needed with other components to provide, receive, process, store, or otherwise manipulate data that may be generated or used within the data processing system 200.

In an example embodiment, the processor 204 and/or the memory 206 may comprise portions of processing circuitry configured to cause the data processing system 200 to perform functionality according to the configuration either hardwired into the processor 204 or provided by the execution of instructions stored in the memory 206. As such, the data processing system 200 may be configured to control processes associated with composite 3D image reconstruction and target identification along with the provision of aimpoint data to other vehicles as described herein. Thus, for example, the data processing system 200 may represent an apparatus that may be configured (e.g., by execution of stored instructions) to generate a composite three dimensional representation of a target based on radar data received at the apparatus from other aerial assets generating projections over an area in which the target 108 is located (e.g., the AOU 119) and based on radar data generated by an aerial asset in which the apparatus is located. The apparatus may be further configured to identify the target 108 based on the composite three dimensional representation, and generate aimpoint data regarding the target based on an identity of the target. This aimpoint data may define the most vulnerable point on the target 108. In an example embodiment, the apparatus may include memory storing at least an updateable target library 232 indicating respective target parameters for a plurality of known potential targets. The processor 204 may be further configured to communicate the aimpoint data from the apparatus, acting as a master vehicle, to at least one of the other aerial assets acting as a slave vehicle. In some embodiments, identifying the target 108 may include comparing the composite three dimensional representation of the target to a plurality of known representations of targets in the target library to determine the identity of the target based on a degree of matching between the composite three dimensional representation and one of the known representations. In some cases, generating aimpoint data may include utilizing characteristics regarding vulnerable locations within the target 108 based on the identity of the target to generate coordinates for an aimpoint for attacking the target. In an example embodiment, the processor 204 may be further configured to shift the apparatus from a master vehicle status to a slave vehicle status thereby causing the apparatus to stop generating the composite three dimensional representation, identifying the target 108 and generating the aimpoint data and instead causing the apparatus to provide radar data generated by the aerial asset to one of the other aerial assets acting as a master vehicle and receive aimpoint data from the master vehicle.

In an example embodiment, the processor 204 of the master vehicle of FIG. 4 may control the collection of radar data and may then use the radar data collected from various different processing units of each of the aerial assets to generate a composite 3D image of the target 108. The composite 3D image of the target 108 may then be used to identify (or confirm the identification of) the target based on comparison of the composite 3D image to known target data. In an example embodiment, the memory 206 may store a target library including image data for various different potential targets. As such, the processor 204 may be configured to determine the class or type of target that the target 108 corresponds to and, in some cases, even perhaps the hull number of certain distinctive targets. The disclosure of commonly owned U.S. Pat. No. 7,968,831 to Meyer et al., which is incorporated herein by reference, describes an example of the use of a target image library for comparing target image data to that of stored image data to determine a specific target.

Example embodiments of the present disclosure may utilize the identification of a specific target 108 to determine vulnerabilities of the corresponding target. The areas on the target 108 may be determined based on known information about the corresponding identified object. This information may then be used to generate aimpoint data that may be provided from the master vehicle to other aerial assets including, for example, one or more missiles 120. In some examples, the aimpoint data may include the relative position of a vulnerable location on the target 108. As such, the aimpoint data may identify a "sweet spot" for hitting the specific identified target 108 based upon the relative location of the target with respect to the master vehicle. The other aerial assets that receive the aimpoint data including the relative location of the target 108 may, in turn, determine the relative location of the target with respect to itself based upon the information provided by the master vehicle and the relative location of the master vehicle with respect to the aerial asset that receives the aimpoint data as determined, for example, based upon the networking of the master vehicle and the other aerial assets. In some embodiments, the aimpoint data may be accompanied with or otherwise include the composite 3D image data as well.

In some example embodiments, the processor 204 may control operation of a target classifier 230 configured to identify or classify targets based on a comparison of the composite 3D image to known target data from a target library 232 (e.g., stored in the memory 206). The identity or classification of the target may then be used by an aimpoint generator 234 to generate aimpoint data as described above. Since each vehicle may be able to operate as the master, each vehicle may have a target library 232 on board. However, in some embodiments, only the master vehicle may actually employ the target library 232.

After the master vehicle provides aimpoint data to the aerial assets, attack on the target 108 may be authorized either by virtue of the aimpoint data being provided or by separate message providing such authorization. In some cases, one or more of the aerial assets that have been provided with the aimpoint data (e.g., those vehicles that are missiles 120) may simply attack the target 108 based on the aimpoint data including the relative location of the target. However, in some other examples, the aerial assets may continue to generate radar data on the target 108 as they approach the target to further confirm (or even modify) the aimpoint data based on perceivable differences between the aimpoint data provided and the current position of the target 108 (e.g., due to evasive maneuvers or other factors that may change target location or orientation).

Many modifications and other embodiments of the disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   receiving, at a receiver of a navigation control vehicle, information regarding a relative position of a target with respect to each of at least two sonobuoys;
   determining, with a processor, the relative position of the target with respect to the navigation control vehicle at least partially based on the information regarding the relative position of the target with respect to each of the at least two sonobuoys; and
   providing information, with a transmitter, regarding the relative position of the target with respect to the navigation control vehicle to an aerial asset comprising a master aerial vehicle, remote from the navigation control vehicle, to facilitate location of the target by the aerial asset, wherein the aerial asset is configured to generate a composite multi-dimensional representation of the target based on a combination of radar data received from other aerial assets that have collected projections over an area in which the target is located as well as radar data collected by the master aerial vehicle, wherein the master aerial vehicle is further configured to identify the target based on the composite multi-dimensional representation, and to generate aimpoint data regarding the target based on an identity of the target.

2. A method according to claim 1 wherein providing the information regarding the relative position of the target with respect to the navigation control vehicle comprises providing the information regarding the relative position of the target with respect to the navigation control vehicle to the aerial asset without provision of an absolute position of the target.

3. A method according to claim 1 further comprising determining a relative position of each of the at least two sonobuoys with respect to the navigation control vehicle, and wherein determining the relative position of the target with respect to the navigation control vehicle further comprises determining the relative position of the target with respect to the navigation control vehicle at least partially based upon the relative position of each of the at least two sonobuoys with respect to the navigation control vehicle.

4. A method according to claim 1 further comprising placing a swarm of sonobuoys in a spaced apart relationship relative to one another and relative to the target.

5. A method according to claim 1 wherein the information regarding the relative position of the target with respect to each of the at least two sonobuoys is based upon a direction of the target relative to the respective sonobuoy, and wherein the method further comprises determining the relative position of the target with respect to the at least two sonobuoys based upon triangulation.

6. A method according to claim 1 wherein providing information regarding the relative position of the target with respect to the navigation control vehicle to an aerial asset comprises providing information regarding the relative position of the target with respect to the navigation control vehicle to at least one of an unmanned aerial vehicle or a missile.

7. An apparatus comprising:
a receiver configured to receive information regarding a relative position of a target with respect to each of at least two sonobuoys;
a processor configured to determine the relative position of the target with respect to a navigation control vehicle at least partially based on the information regarding the relative position of the target with respect to each of the at least two sonobuoys; and
a transmitter configured to provide information regarding the relative position of the target with respect to the navigation control vehicle to an aerial asset comprising a master aerial vehicle, remote from the navigation control vehicle, to facilitate location of the target by the aerial asset, wherein the aerial asset is configured to generate a composite multi-dimensional representation of the target based on a combination of radar data received from other aerial assets that have collected projections over an area in which the target is located as well as radar data collected by the master aerial vehicle, wherein the master aerial vehicle is further configured to identify the target based on the composite multi-dimensional representation, and to generate aimpoint data regarding the target based on an identity of the target.

8. An apparatus according to claim 7 wherein the transmitter is further configured to provide the information regarding the relative position of the target with respect to the navigation control vehicle by providing the information regarding the relative position of the target with respect to the navigation control vehicle to the aerial asset without provision of an absolute position of the target.

9. An apparatus according to claim 7 wherein the processor is further configured to determine a relative position of each of the at least two sonobuoys with respect to the navigation control vehicle, and wherein the processor is configured to determine the relative position of the target with respect to the navigation control vehicle by determining the relative position of the target with respect to the navigation control vehicle at least partially based upon the relative position of each of the at least two sonobuoys with respect to the navigation control vehicle.

10. An apparatus according to claim 7 wherein the information regarding the relative position of the target with respect to each of the at least two sonobuoys is based upon a direction of the target relative to each of the at least two sonobuoys, and wherein the processor is further configured to determine the relative position of the target with respect to the respective sonobuoy based upon triangulation.

11. An apparatus according to claim 7 wherein the transmitter is further configured to provide information regarding the relative position of the target with respect to the navigation control vehicle to an aerial asset comprises providing information regarding the relative position of the target with respect to the navigation control vehicle to at least one of an unmanned aerial vehicle or a missile.

12. A system comprising:
at least two sonobouys configured to detect a target and to determine a relative position of the target with respect to a respective sonobuoy;
a navigation control vehicle configured to receive information regarding the relative position of a target with respect to each of the at least two sonobuoys, to determine a relative position of the target with respect to the navigation control vehicle at least partially based on the information regarding the relative position of the target with respect to each of the at least two sonobuoys, and to provide information regarding the relative position of the target with respect to the navigation control vehicle; and
an aerial asset configured to receive the information regarding the relative position of the target with respect to the navigation control vehicle and to determine a relative position of the target with respect to the aerial asset at least partially based on the information regarding the relative position of the target with respect to the navigation control vehicle,
wherein the aerial asset comprises a master aerial vehicle that is further configured to generate a composite multi-dimensional representation of the target based on a combination of radar data received from other aerial assets that have collected projections over an area in which the target is located as well as radar data collected by the master aerial vehicle, wherein the master aerial vehicle is further configured to identify the target based on the composite multi-dimensional representation, and to generate aimpoint data regarding the target based on an identity of the target.

13. A system according to claim 12 wherein the navigation control vehicle is further configured to provide the information regarding the relative position of the target with respect to the navigation control vehicle without provision of an absolute position of the target, and wherein the aerial asset is further configured to determine the relative position of the target with respect to the aerial asset without receipt of the absolute position of the target.

14. A system according to claim 12 wherein the navigation control vehicle is further configured to determine a relative position of each of the at least two sonobuoys with respect to the navigation control vehicle and to determine the relative position of the target with respect to the navigation control vehicle by determining the relative position of the target with respect to the navigation control vehicle at least partially based upon the relative position of each of the at least two sonobuoys with respect to the navigation control vehicle.

15. A system according to claim 12 wherein the aerial asset is further configured to determine a relative position of the navigation control vehicle with respect to the aerial asset and to determine the relative position of the target with respect to the aerial asset by determining the relative position of the target with respect to the aerial asset at least partially based upon the relative position of the navigation control vehicle with respect to the aerial asset.

16. A system according to claim 12 wherein the aerial asset comprises at least one of an unmanned aerial vehicle and a missile.

17. A system according to claim 12 further comprising a swarm of sonobuoys in a spaced apart relationship relative to one another and relative to the target.

18. A system according to claim 12 wherein the master aerial vehicle is further configured to generate aimpoint data regarding the target based on an identity of the target, the aimpoint data defining a most vulnerable point on the target.

19. A method according to claim 1 wherein providing information regarding the relative position of the target with respect to the navigation control vehicle comprises establishing networking with the aerial asset from which a relative location of the aerial asset from the navigation control vehicle is determinable.

20. An apparatus according to claim 7 wherein the transmitter is further configured to establish networking with the aerial asset from which a relative location of the aerial asset from the navigation control vehicle is determinable.

* * * * *